J. G. FAIRBANKS.
EXCAVATING APPARATUS.
APPLICATION FILED DEC. 6, 1909.
1,056,268.
Patented Mar. 18, 1913.
3 SHEETS—SHEET 1.
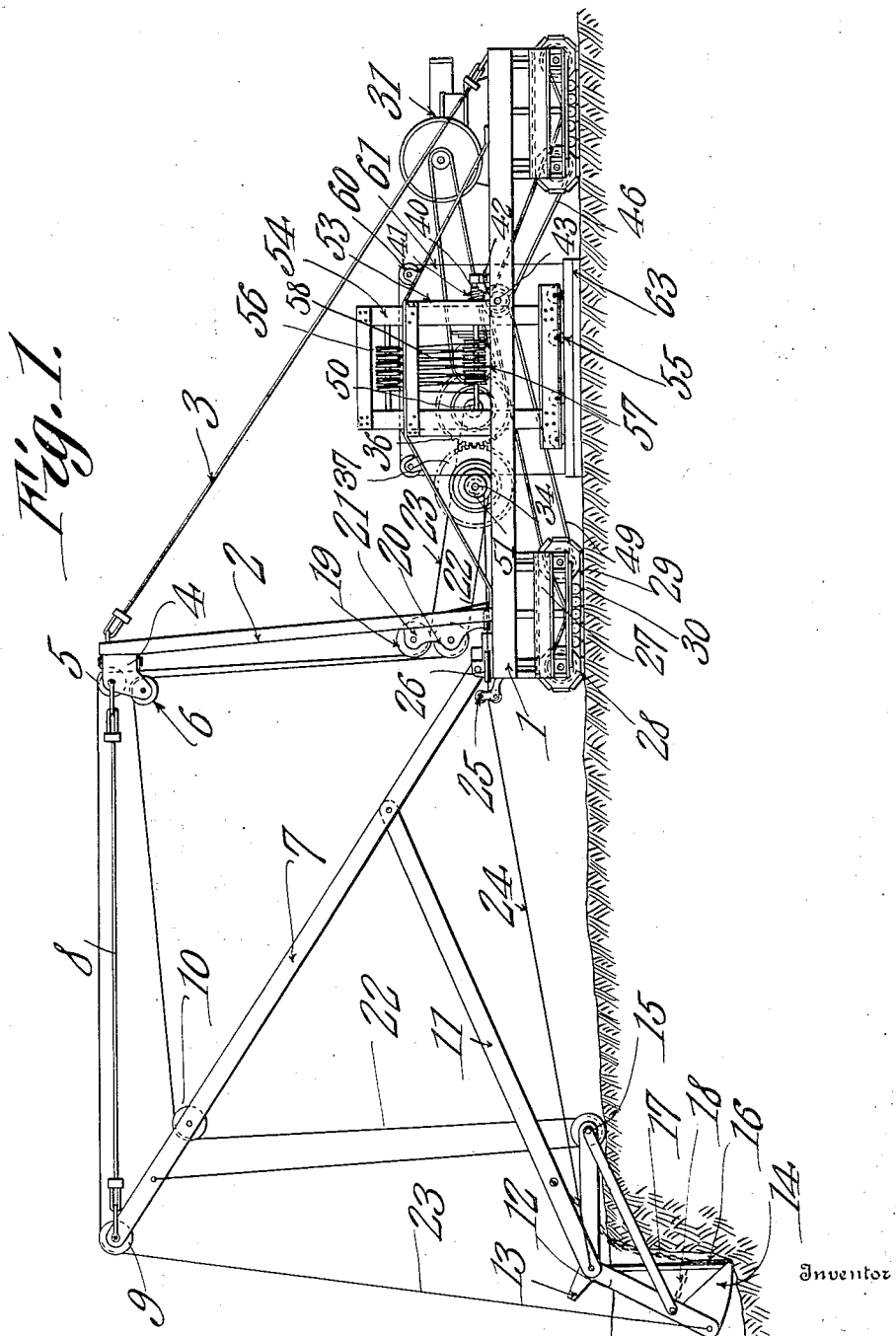
Witnesses
Inventor
James G. Fairbanks.
By C. A. Snow & Co.
Attorneys

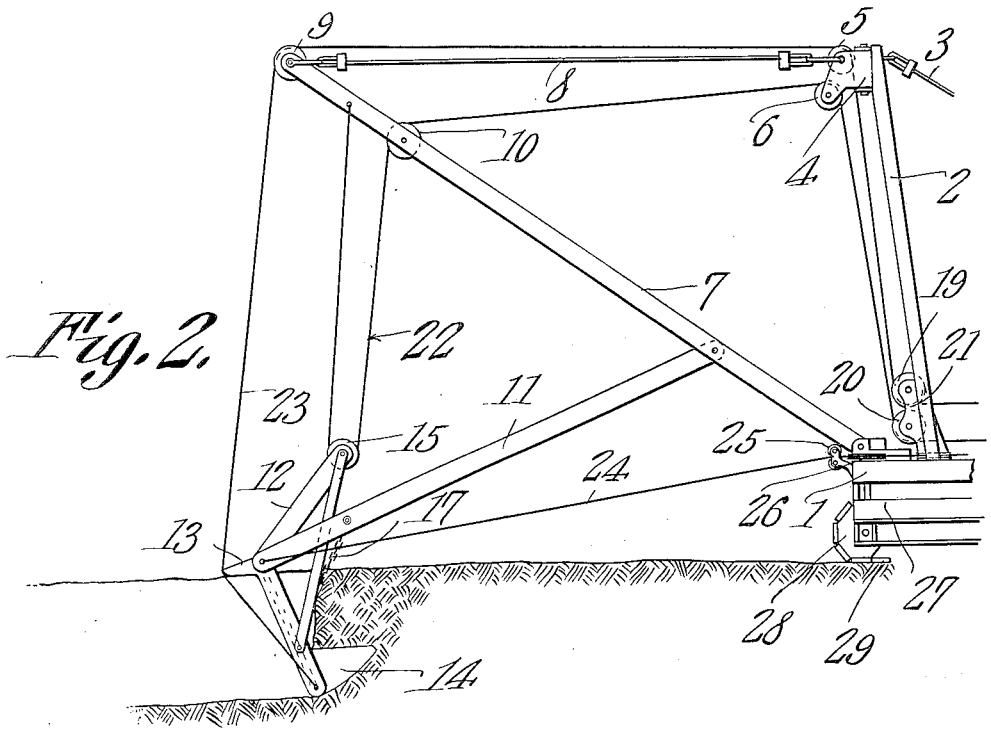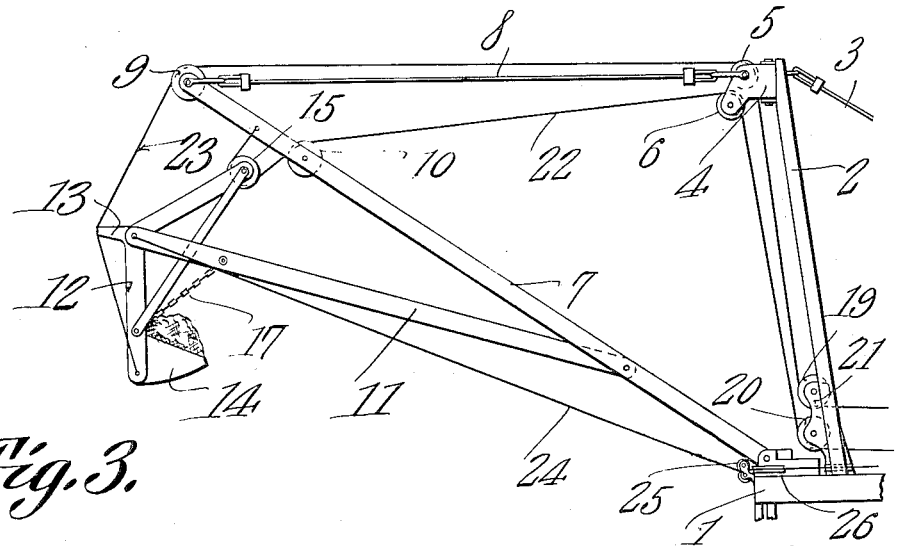

J. G. FAIRBANKS.
EXCAVATING APPARATUS.
APPLICATION FILED DEC. 6, 1909.

1,056,268.

Patented Mar. 18, 1913.
3 SHEETS—SHEET 3.

Inventor
James G. Fairbanks.

Witnesses

By C. A. Snow & Co.
Attorneys

UNITED STATES PATENT OFFICE.

JAMES G. FAIRBANKS, OF MARION, OHIO.

EXCAVATING APPARATUS.

1,056,268.   Specification of Letters Patent.   Patented Mar. 18, 1913.

Application filed December 6, 1909. Serial No. 531,644.

*To all whom it may concern:*

Be it known that I, JAMES G. FAIRBANKS, a citizen of the United States, residing at Marion, in the county of Marion and State of Ohio, have invented a new and useful Excavating Apparatus, of which the following is a specification.

This invention relates to an excavating apparatus especially designed to be used for cutting ditches and it consists in the novel construction and arrangement of its parts as hereinafter shown and described.

The object of the invention is to provide in an apparatus as indicated, a pivoted arm upon which is pivotally mounted a bell crank. A dipper is carried at one end of the bell crank and a hoisting cable or line is connected with the other end of the bell crank and is adapted to swing the bell crank to cause the dipper to make an incision in the earth and then lift the bell crank and the free end of the arm. A line is connected with that end of the bell crank which carries the dipper and when drawn is adapted to swing the bell crank to cause the dipper to assume dumping position. A gate is pivotally mounted upon the bell crank and bridle chains are provided which limit the swinging movement of the gate and cause the same to traverse the length of the dipper as the dipper assumes dumping position whereby the said gate serves as a cleaner for the dipper.

A further object of the invention is to provide means for actuating the cables to operate the dipper, the bell crank and the arm. This means includes a platform mounted upon tractors and having a source of power as for instance an engine mounted upon the same. Means is provided for transmitting movement from the engine to the tractors whereby the entire apparatus may be moved from point to point at desired intervals. Also means is provided for elevating the tractors and supporting the apparatus upon rollers whereby the apparatus may be readily turned. Numerous drums are mounted upon the platform and means are provided for transmitting rotary movement from the engine to the said drums severally or collectively in such series as desired as will hereinafter appear.

Figure 4:
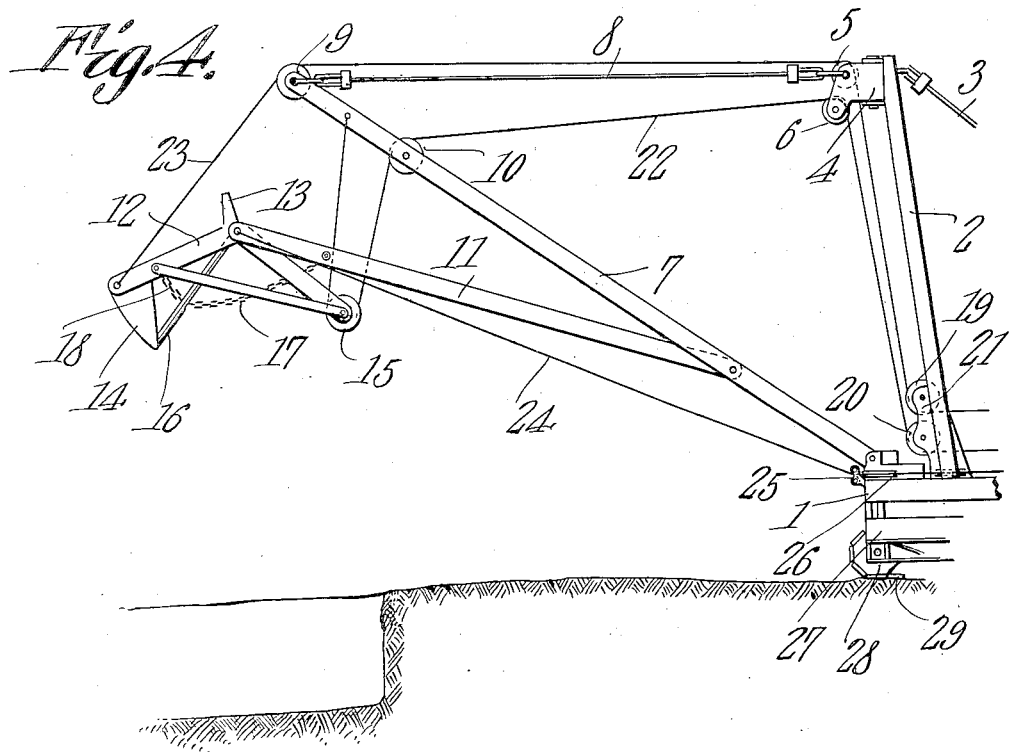
Figure 5:
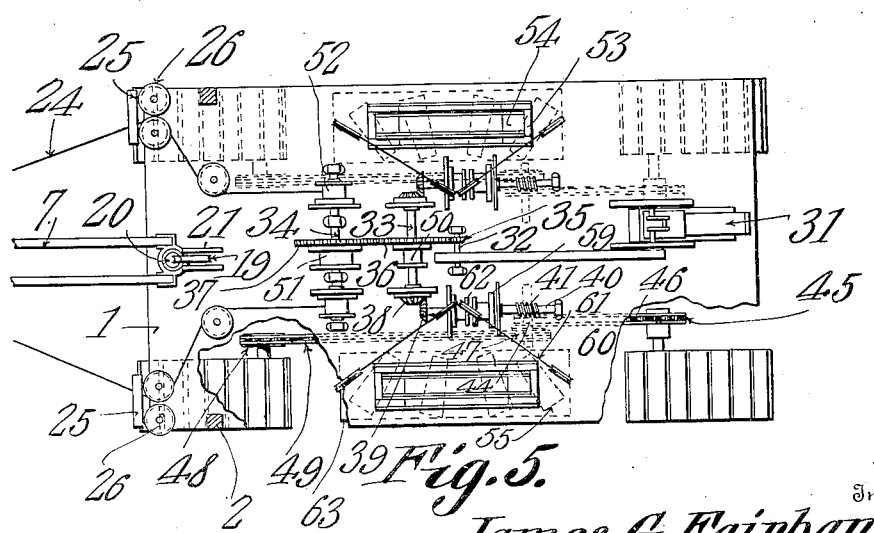

In the accompanying drawings:—Figure 1 is a side elevation of the apparatus. Fig. 2 is a side elevation of a portion of the apparatus, showing the dipper in position when making an incision in the ground. Fig. 3 is a side elevation of a portion of the apparatus showing the dipper sustaining a load in an elevated position. Fig. 4 is a side elevation of a portion of the apparatus showing the dipper in dumping position. Fig. 5 is a top plan view of the platform of the apparatus showing the actuating means located thereon.

The excavating apparatus includes a platform 1 upon which is mounted a derrick or mast 2 having the supporting cables 3 connected with the upper portion thereof, the lower ends of the said cables being connected with that end portion of the platform 1 opposite the end thereof upon which the mast 2 is mounted. A sleeve 4 is pivotally mounted at the upper portion of the mast 2 and carries journaled sheaves 5 and 6. A boom 7 is pivotally connected at its lower end with the platform 1 in the vicinity of the base of the mast 2 and a cable 8 connects the upper end portion of the said boom with the sleeve 4. Sheaves 9 and 10 are journaled at the upper portions of the boom 7, the sheave 9 being located at the extremity of the said boom and the sheave 10 at a point in the vicinity of the end of the said boom. An arm 11 is pivotally connected at one end to the boom 7 at a point intermediate the ends thereof. A bell crank 12 is pivoted to the free end of the arm 11 and is provided with an outstanding strut 13 located in the vicinity of its angle. A dipper 14 is fixed to one end of the bell crank 12 and a sheave 15 is journaled at the other end thereof. A gate 16 is pivoted to the bell crank 12 and the lower portion of the said gate lies in the dipper 14. A bridle chain 17 connects the gate 16 with the arm 11 and a bridle chain 18 connects the said gate with the bell crank 12. The bridle chains 17 and 18 are adapted to limit the swinging movement of the gate 16 to an extent equal to the length of the dipper 14. Thus the said gate 16 when at the back of the dipper serves as an abutment for the material contained in the dipper and as the said gate swings toward the cutting edge of the dipper it serves as a cleaner or sweep for the dipper. Sheaves 19 and 20 are journaled for rotation in a standard 21 mounted upon the platform 1. A cable 22 is attached at one end to the outer portion of the boom 7 and passes under the sheave 15 thence up and over the sheave 10 thence over the sheave 6 thence down and under the sheave 20 to a winding drum hereinafter to be described mounted upon the platform 1. A cable 23 is connected at one end with that end of the bell crank 12 to which the dipper 14 is attached thence passes up and over the sheave 9 thence over the sheave 5 thence down and under the sheave 19 to a winding drum hereinafter to be described mounted upon the platform 1. Cables 24 are connected at their ends to the outer portion of the arm 11 and extend to the opposite sides of the platform 1 and pass between rollers 25 horizontally journaled for vertical rotation and thence between guiding sheaves 26 vertically journaled for horizontal rotation and thence to winding drums mounted upon the platform 1 and hereinafter to be described.

The platform 1 is supported at each of its four corners upon a truck frame 27 on each of which is journaled a pair of rollers 28. Webs 29 surround the rollers of each pair and are adapted to move in orbits about the same. Supplemental rollers 30 are interposed between the lower runs of the webs 29 and the truck frame 27 and serve as means for holding the lower runs of the said webs in contact with the surface of the ground.

An engine 31 is mounted upon the platform 1 and its shaft is belted or otherwise operatively connected with a shaft 32 journaled for rotation upon the said platform. Shafts 33 and 34 are also journaled for rotation upon the platform 1 and are parallel with the shaft 32. The shafts 32, 33 and 34 are operatively connected together by means of intermeshing gear wheels 35, 36 and 37 located upon the said shafts respectively. Beveled gear wheels 38 are mounted upon the ends of the shaft 33 and mesh with beveled gear wheels 39 fixed to the ends of shafts 40 which extend at right angles to the shaft 33. Each shaft 40 is provided with a worm 41 which meshes with a worm wheel 42 mounted upon a shaft 43. Sprocket wheels 44 are fixed to the shaft 43 and sprocket wheels 45 are fixed to the shafts of the innermost rollers 28 at one end of the platform 1. Sprocket chains 46 pass around the sprocket wheels 44 and 45 and are adapted to transmit rotary movement from the shafts 43 to the rollers 28 which have the sprocket wheels 45 mounted upon their shafts. Sprocket wheels 47 are also fixed to the shafts 43 and sprocket wheels 48 are fixed to the shafts of the innermost rollers 28 at the opposite end of the platform 1. Sprocket chains 49 pass around the sprocket wheels 47 and 48 and are adapted to transmit rotary movement from the shaft 43 to the last said rollers 28. Thus it will be seen that means is provided for transmitting movement from the shaft 33 to the four sets of rollers at the corners of the platform and consequently during the rotation of the shaft 33 the webs 29 are moving in orbits about the said rollers and the apparatus is being propelled over the surface of the ground.

A drum 50 is mounted upon the shaft 33 upon which the cable 23 is adapted to wind, and a drum 51 is mounted upon the shaft 34 upon which the cable 22 is adapted to wind. The said drums are loosely mounted upon their respective shafts but any suitable clutch mechanism not shown, may be provided for causing them to rotate with their shafts. Drums 52 are mounted upon the shafts 34 and the cables 24 are adapted to wind upon the said drums 52.

Vertically disposed guides 53 are mounted at the sides of the platform 1 and spud or jack frames 54 are slidably mounted in the said guides 53. Conical rollers 55 are journaled at the lower ends of the frames 54 and the axes of the rollers in each frame converge toward each other under the middle of the platform 1. A series of sheaves 56 is journaled for rotation in the upper portion of each frame 54 and a series of sheaves 57 is journaled for rotation at each side of the platform 1. A cable 58 is attached at one end of the platform 1 and then passes alternately around the sheaves 56 and 57 and the other end portion of the said cable 58 is adapted to wind upon a drum 59 mounted upon the shaft 40. It is of course understood that the said sheaves and cables are in duplicate and one is located at each side of the said platform. Sheaves 60 are journaled for rotation above the platform 1 and cables 61 pass over the said sheaves 60. At their inner ends the cables 61 are adapted to wind upon drums 62 mounted upon the shafts 40 and at their outer ends the said cables 61 are connected with the front and rear ends of track boards 63 which are located between the surface of the ground and the rollers 55.

In operation the shafts 33 and 34 are in a continuous state of rotation and as heretofore described movement is transmitted from the shaft 33 to the web 29 and consequently the apparatus is moving (at a slow rate of speed) along the surface of the ground. To cause the dipper 14 to cut an incision in the ground the cables 22 and 23 are permitted to pay out so that the free end of the arm 11 will swing down and the cutting edge of the dipper 14 will come in contact with the surface of the ground. The drum 51 is then rendered active with the shaft 34 and the cable 22 is wound thereon and the said cable in turn will swing the bell crank 12 upon its pivot and cause the dipper 14 to enter the ground in the manner as shown in Fig. 2 of the drawings. The pull upon the cable 22 is continued whereby the dipper 14 and its contents are elevated into the positions shown in Fig. 3 of the drawings. At the same time by drawing upon one or the other of the cables 24 the boom 7 and its attachments may be swung to one side or the other of the platform 1. After the arm 11 has been sufficiently elevated the pull upon the cable 22 is stopped but the said cable is held taut and a pull is exerted upon the cable 23 by rendering the drum 50 active with the shaft 33. As the said cable 23 becomes taut it swings the bell crank 12 upon its pivot and the dipper 14 is swung from the load retaining position shown in Fig. 3 into the dumping position shown in Fig. 4. During the act of swinging the dipper from load retaining position to dumping position the bridle chain 17 becomes taut and sweeps the gate 16 along the length of the said dipper and thus the material is positively poured from the dipper. The movement of the gate 16 along the bottom of the dipper 14 is limited by the bridle chain 18 connected with the said gate and the bell crank 12. By reference to Fig. 3 of the drawing it will be seen that when the dipper 14 is in an elevated position the strut 13 of the bell crank 12 bears against the side of the cable 23 and causes the same to assume an angle between the sheave 9 and its point of attachment with the said bell crank 12. Thus when a pull is exerted upon the said cable 23 it will readily swing the bell crank 12 upon its pivotal connection with the arm 11. Thus it will be seen that while the excavating, elevating and dumping operation is being accomplished the apparatus is progressing along the surface of the ground.

When it is desired to turn the apparatus the cables 61 are slackened so that the track board 63 rests upon the surface of the ground. The cables 58 are then wound upon the drums 59 so that the jack frames 54 are moved down through the guides 53 and the rollers 55 bear against the upper surfaces of the track board 63. The jack frames 54 are forced down to such an extent as to lift the webs 29 above the surface of the ground. Then the boom 7 is swung to one side of the platform 1 and the arm 11 is lowered so that the dipper 14 comes in contact with the surface of the ground and then by drawing upon the cable 22 the said dipper serves as a ground hook or anchor and that end portion of the platform 1 toward the dipper is swung around in the direction of the dipper. This operation may be repeated until the apparatus has been completely swung around or turned. After this has been accomplished the cables 58 may be slacked and the cables 61 wound upon the drums 59 whereby the track boards 63 will be elevated together with the frames 54.

Having described the invention what I claim as new and desire to secure by Letters Patent is:—

1. In an excavating apparatus, a pivoted arm, a bell crank pivoted to the arm and having an outwardly disposed strut located at a point between its ends, a dipper carried at one end of the bell crank, and traction means engaging one at each end of the bell crank, said struts adapted to engage one of said traction means.

2. In an excavating apparatus, a pivoted arm, a bell crank pivoted to the arm, a dipper carried at one end of the bell crank, a traction means for swinging the bell crank upon the pivoted arm, a pivoted gate arranged to move along the dipper and bridle means for holding the gate while the dipper swings.

3. In an excavating apparatus, a pivoted arm, a bell crank pivoted to the arm, a dipper carried at one end of said bell crank, a traction means for swinging the bell crank, a pivoted gate arranged to move along the dipper, bridle means for holding the gate during the swinging movement of the dipper and means for limiting the swinging movement of the dipper with relation to the gate.

4. An excavating apparatus comprising a boom, an arm pivoted to the boom, a bell crank pivoted to the arm, a dipper carried at one end of the bell crank and a traction means engaging the other end of the bell crank and guided upon the boom.

5. In an excavating apparatus a boom, an arm pivoted to the boom, a bell crank pivoted to the arm, a dipper carried at one end of the bell crank, and traction means engaging one end of the bell crank and guided upon the boom.

6. The combination, with a boom, of a scoop or dipper pivoted thereon, arms pivotally connected with said boom and depending within said scoop, a scraper blade carried by said arms and adapted to sweep over the bottom of said scoop from end to end thereof, said scraper being forced backwardly in said scoop while it is being filled, and means for checking the backward movement of said scraper when near the rear end of said scoop, for the purpose specified.

7. The combination, with a boom, of a scoop pivoted thereon, a scraper pivotally supported by said boom, and depending within said scoop and free to swing by gravity from one end to the other of said scoop, and means for limiting the swinging of said scraper.

8. The combination, with a boom, of a scoop pivoted thereon, a scraper having a pivot concentric with the pivot of said scoop on said boom and adapted to swing in said scoop lengthwise thereof, and means for limiting the backward movement of said scraper during the dumping operation.

In testimony that I claim the foregoing as my own, I have hereto affixed my signature in the presence of two witnesses.

JAMES G. FAIRBANKS.

Witnesses:
R. C. McCOLLUM,
M. KELLY.